United States Patent
Xie et al.

(10) Patent No.: US 10,389,859 B1
(45) Date of Patent: Aug. 20, 2019

(54) MOBILE TERMINAL AND METHOD FOR MIRROR ACTIVATING FUNCTION AND STORAGE DEVICE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Xiao-Peng Xie, Zhengzhou (CN); Jun-Wei Zhang, Zhengzhou (CN); Jun Zhang, Shenzhen (CN); Yi-Tao Kao, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/213,750

(22) Filed: Dec. 7, 2018

(30) Foreign Application Priority Data

Sep. 5, 2018 (CN) .......................... 2018 1 1033036

(51) Int. Cl.
| | |
|---|---|
| *H04M 1/00* | (2006.01) |
| *H04M 1/02* | (2006.01) |
| *G06F 1/16* | (2006.01) |
| *G06F 3/01* | (2006.01) |
| *A47G 1/02* | (2006.01) |

(52) U.S. Cl.
CPC ............ *H04M 1/0266* (2013.01); *A47G 1/02* (2013.01); *G06F 1/1637* (2013.01); *G06F 1/1656* (2013.01); *G06F 3/017* (2013.01)

(58) Field of Classification Search
CPC .. H04M 1/0266; H04M 2250/52; A47G 1/02; G06F 1/1637; G06F 1/1656; G06F 3/017; G02B 5/0808
See application file for complete search history.

(56) References Cited

U.S. PATENT DOCUMENTS

| | | | | |
|---|---|---|---|---|
| 2007/0066247 A1* | 3/2007 | Mooney | .................. | H04M 1/21 455/90.3 |
| 2014/0146093 A1* | 5/2014 | Sako | .................... | G09G 3/3406 345/690 |
| 2016/0241783 A1* | 8/2016 | Fukui | .................. | H04N 5/23245 |
| 2018/0217429 A1* | 8/2018 | Busch | .................. | G02F 1/1395 |

* cited by examiner

*Primary Examiner* — Barry W Taylor
(74) *Attorney, Agent, or Firm* — ScienBiziP, P.C.

(57) ABSTRACT

A mobile terminal able to autonomously recognize when a user requires the mobile terminal to function as a mirror includes a housing, a screen with one-way see-through glass, a gravity sensor, a distance sensor, a front camera, a processor, and a storage device. At least two kinds of information are being collected, namely an orientation of the mobile terminal collected by the gravity sensor and a distance between a face and the screen collected by the distance sensor. Other information as to a facial expression and hand actions can also be collected by the front camera. The information is analyzed and a determination is made as to whether the user wishes to look in a mirror, and the screen will be controlled to be dark and shut down for the mirror function.

9 Claims, 3 Drawing Sheets

MOBILE TERMINAL AND METHOD FOR MIRROR ACTIVATING FUNCTION AND STORAGE DEVICE

FIELD

The subject matter relates to mobile terminal functions.

BACKGROUND

Many smart phones have a mirror function, which makes it convenient for a user to see his or her image at any time. However, a software needs to be installed for the mirror, and opening steps of the related software may be cumbersome and time consuming. Furthermore, when the user walks on the road while using the mirror function of a smart phone, there may be a safety hazard for the user because the sight line of the user may be hindered by the smart phone.

Therefore, there is room for improvement within the art.

BRIEF DESCRIPTION OF THE DRAWINGS

Implementations of the present technology will now be described, by way of embodiments only, with reference to the attached figures.

DETAILED DESCRIPTION

Figure 1:
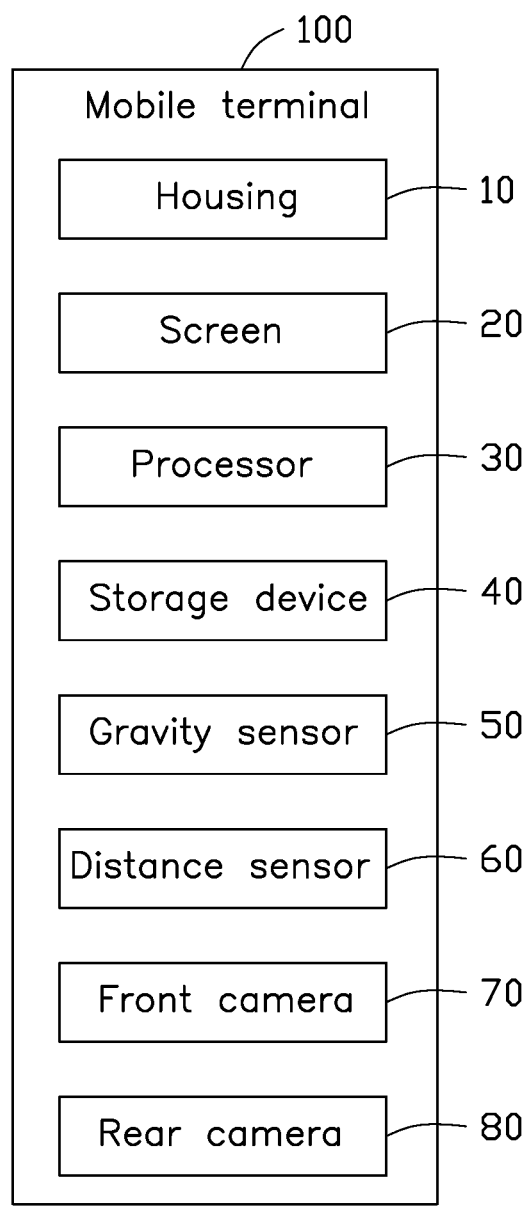
FIG. 1 is a block diagram of an embodiment of a mobile terminal of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a block diagram of a mobile terminal 100 of an embodiment of the present disclosure. The mobile terminal 100 can include a housing 10, a screen 20, a processor 30, a storage device 40, a gravity sensor 50, a distance sensor 60, a front camera 70, and a rear camera 80. The screen 20, the processor 30, the storage device 40, the gravity sensor 50, the distance sensor 60, the front camera 70, and the rear camera 80 can be positioned on the housing 10. The screen 20, the storage device 40, the gravity sensor 50, the distance sensor 60, the front camera 70, and the rear camera 80 can be electrically connected to the processor 30. The mobile terminal 100 can further include common components such as a circuit board and a battery, and details of which are not given herein.

The screen 20 can be a touch screen. In the embodiment as disclosed herein, the screen 20 has a one-way see-through glass (not shown in FIG. 1). When the screen 20 is switched off or in a dark state wherein ambient light intensity outside the screen 20 is much greater than that in the screen 20. The mirror function of the one-way see-through glass of the screen 20 is similar to that of a common mirror, so that the screen 20 may become a mirror. When the screen 20 is lit, the mirror function cannot function, and the screen 20 can be used as a display screen.

The processor 30 can be a central processing unit, a digital signal processor, or a single chip microcomputer and so on. The processor 30 can be configured to process related data and transmit a plurality of instructions.

The storage device 40 can store data and a plurality of instructions, and the instructions are adapted to be loaded and executed by the processor 30. The storage device 40 is capable of storing information of a preset distance threshold between a face and the screen 20. Such information further includes an orientation of the mobile terminal 100 habitually held by the user when using the mirror of the mobile terminal 100, and repeated actions of the user's hand when using the mirror of the mobile terminal 100. The preset distance threshold is adjustable, and the user can adjust a specific value of the preset distance threshold as needed. The orientation of the mobile terminal 100 habitually held by the user when using the mirror can include a lateral orientation and a vertical orientation. The repeated actions of the user include hands touching the cheeks, hands smoothing the hair, etc. when using the mirror of the mobile terminal 100.

It can be understood that the storage device 40 can be a hard disk, a USB flash disk, a random access memory, and so on.

In at least one embodiment, the storage device 40 can be an internal storage system such as a flash memory, a random read memory RAM, a readable memory ROM, and so on.

In at least one embodiment, the storage device 40 can also be a storage system, such as a video disc, a memory card, or a data storage medium.

In at least one embodiment, the storage device 40 can include two or more storage devices, for example, one of the storage devices is for memory, and the other storage device is for programs.

The gravity sensor 50 can be configured to sense an orientation of the mobile terminal 100 held by the user and transmit the sensed orientation of the mobile terminal 100 to the processor 30, wherein the orientation of the mobile terminal 100 includes a lateral orientation and a vertical orientation.

The distance sensor 60 can be configured to sense a distance between a face and the screen 20 and transmit a value of the sensed distance to the processor 30.

The front camera 70 can be configured to collect information including facial expressions and hand actions in front of the screen 20 and transmit the information to the processor 30.

The rear camera 80 can be configured to collect images of scene to one side of the mobile terminal 100 opposite to the screen 20 and display the images of scene through a small window (not shown in FIG. 1) of the screen 20, so that the scene in front of the rear camera 80 can be viewed from the screen 20.

Figure 2:
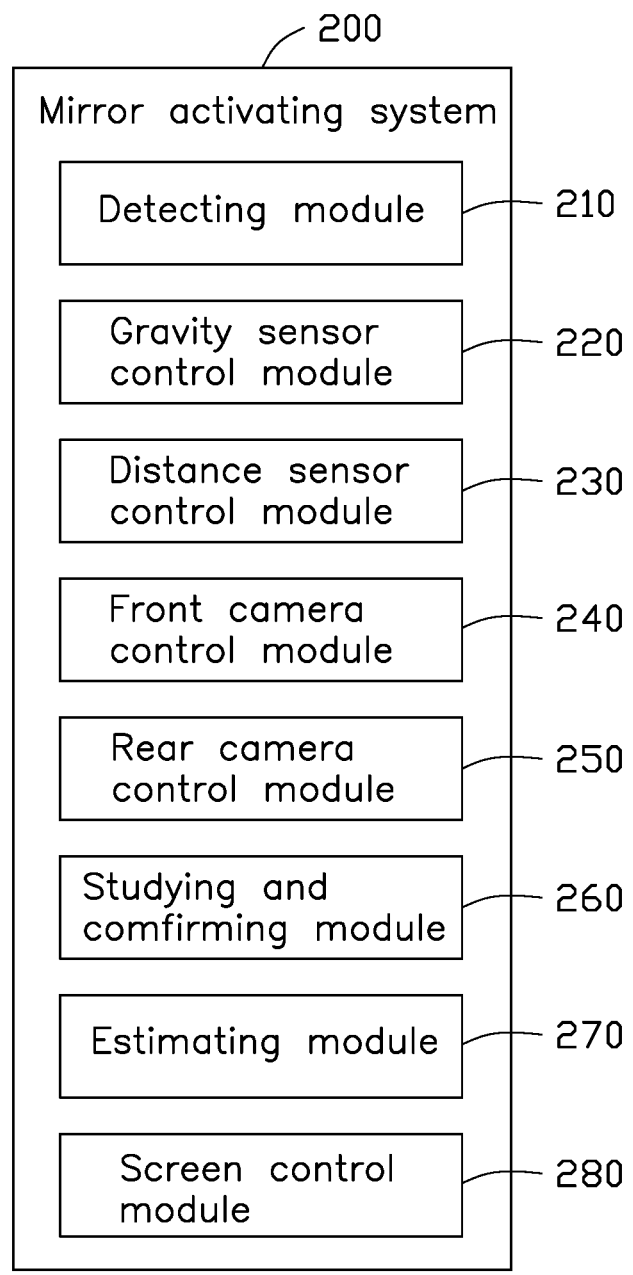
FIG. 2 is a block diagram of an embodiment of a mirror activating system of the present disclosure.

Referring to FIG. 2, FIG. 2 is a module diagram of a mirror activating system 200 according to an embodiment of the present disclosure. The mirror activating system 200 can be applied to the mobile terminal 100. The mirror activating system 200 can include a detecting module 210, a gravity sensor control module 220, a distance sensor control module 230, a front camera control module 240, a rear camera control module 250, a studying and confirming module 260, an estimating module 270, and a screen control module 280. In an embodiment, each of the detecting module 210, the gravity sensor control module 220, the distance sensor control module 230, the front camera control module 240, the rear camera control module 250, the studying and confirming module 260, the estimating module 270, and the screen control module 280 are a series of computer program instructions that can be executed and performed as a fixed function by the processor 30 of the mobile terminal 100 stored in the storage device 40 of the mobile terminal 100. In other embodiments, each of the detecting module 210, the gravity sensor control module 220, the distance sensor control module 230, the front camera control module 240, the rear camera control module 250, the studying and confirming module 260, the estimating module 270 and the screen control module 280 can be a plurality of hardware units.

The detecting module 210 can be configured to detect whether the screen 20 is turned on and transmit the opening or shut-down state of the screen 20 to the processor 30.

The gravity sensor control module 220 can be configured to control the gravity sensor 50 to sense an orientation of the mobile terminal 100 held by the user and transmit the sensed orientation of the mobile terminal 100 to the processor 30.

The distance sensor control module 230 can be configured to control the distance sensor 60 to sense the distance between a face and the screen 20 and transmit a value of the sensed distance to the processor 30.

The front camera control module 240 can be configured to control the front camera 70 to collect information including facial expressions and hand actions in front of the screen 20 and transmit the information to the processor 30.

The rear camera control module 250 can be configured to control the rear camera 80 to collect images of scene on a side of the mobile terminal 100 opposite to the screen 20 and display the images of scene through a small window (not shown in FIG. 2) of the screen 20.

The studying and confirming module 260 can be configured to adjust the preset distance threshold stored in the storage device 40 according to values of the distance between a face and the screen 20 sensed by the distance sensor 60 each time the mirror of the mobile terminal 100 is used, study and confirm facial expression changes indicating that the mirror is needed according to the facial expressions collected by the front camera 70 when the mirror of the mobile terminal 100 is used each time. The studying and confirming module 260 can be further configured to confirm an orientation of the mobile terminal 100 habitually held each time the mirror of the mobile terminal 100 is used, and confirm repeated actions of the hands when the mirror of the mobile terminal 100 is used each time.

The estimating module 270 can be configured to compare an orientation of the mobile terminal 100 sensed by the gravity sensor 50 with the orientation of the mobile terminal 100 habitually held stored in the storage device 40. The estimating module 270 can be configured to compare a value of a distance between a face and the screen 20 sensed by the distance sensor 60 with the preset distance threshold stored in the storage device 40. The estimating module 270 can be configured to compare a plurality of hand actions collected by the front camera 70 with the repeated actions stored in the storage device 40. The estimating module 270 can be configured to estimate whether or not the facial expression changes according to a plurality of facial expressions collected by the front camera 70. The estimating module 270 can be further configured to make a determination as to whether the user has a need to look in the mirror according to the comparison results and the estimating result.

Specifically, for example, such determination requires at least two kinds of information selected from following information to be met: first, the orientation of the mobile terminal 100 held by the user sensed by the gravity sensor 50 is the same as the orientation of the mobile terminal 100 habitually held stored in the storage device 40. Second, the value of a distance between the face and the screen 20 sensed by the distance sensor 60 is greater than the value of the preset distance threshold stored in the storage device 40. Third, the plurality of hand actions collected by the front camera 70 is the same as the repeated actions stored in the storage device 40, and fourth, the facial expression is estimated to have changed according to the plurality of facial expressions collected by the front camera 70, so that the user can be taken as needing to look in the mirror. Otherwise, the user does not have the need to look in the mirror.

In this embodiment, the changes of the facial expression can include smiling, blinking, and so on.

The screen control module 280 can be configured to control the screen 20 to be switched off or in a dark state, and control the screen 20 to open a small window (not shown) to display the images of scene collected by the rear camera 80.

Figure 3:
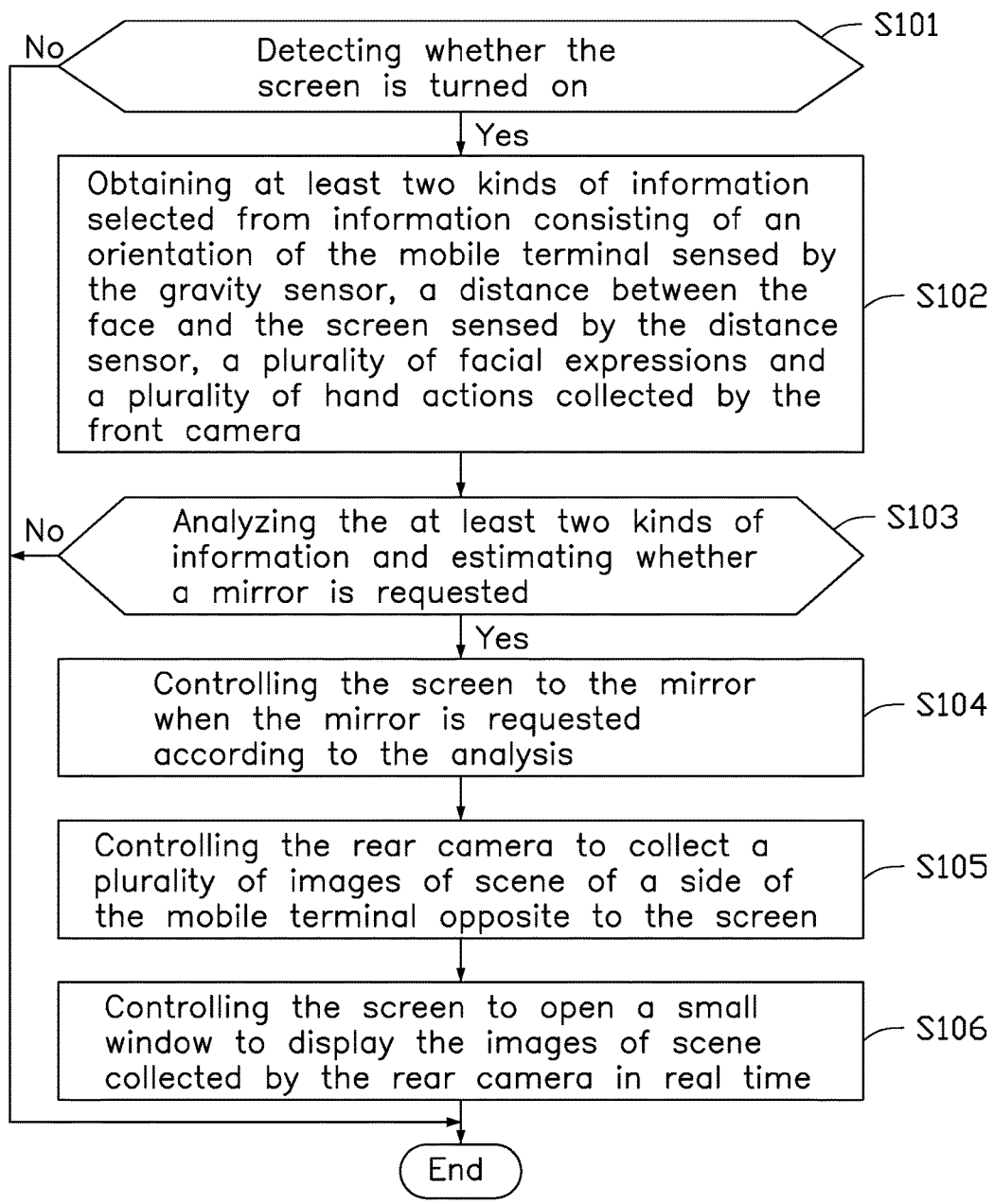
FIG. 3 is a flowchart of an embodiment of a mirror activating method of the mobile terminal.

FIG. 3 shows a flowchart of a mirror activating method of the mobile terminal 100 according to an embodiment of the present disclosure. The mirror activating method of the mobile terminal is an embodiment of the present disclosure, because there are many ways to implement the method. Referring to FIG. 1 to FIG. 3, the mirror activating method of the mobile terminal to be described next can be executed by the module shown in FIGS. 1-2. Each of the blocks in FIG. 3 can represent one or more steps, methods, or sub-flows and so on executed by the example method. The mirror activating method of the mobile terminal using the mirror activating system 200 described above to automatically make the screen 20 of the mobile terminal 100 function as a mirror includes the following blocks:

S101: detecting whether the screen 20 is turned on, and if so, proceed to block S102; if not, the process ends, and the screen 20 can be directly used as a mirror for the user to look in the mirror.

Specifically, the detecting module 210 detects whether the screen 20 is turned on, and if so, proceed to block S102; if not, the process ends, and the screen 20 can be directly used as a mirror for the user to look in the mirror.

S102: obtaining at least two kinds of information selected from information consisting of an orientation of the mobile terminal 100 sensed by the gravity sensor 50, a distance between the face and the screen 20 sensed by the distance sensor 60, a plurality of facial expressions and a plurality of hand actions collected by the front camera 70.

Specifically, the gravity sensor control module 220 controls the gravity sensor 50 to sense an orientation of the mobile terminal 100 held by the user and transmit the sensed orientation of the mobile terminal 100 to the processor 30; the distance sensor control module 230 controls the distance sensor 60 to sense the distance between a face and the screen 20 and transmit a value of the sensed distance to the processor 30; the front camera control module 240 controls the front camera 70 to collect a plurality of facial expressions and hand actions in front of the screen 20 and transmit the collected plurality of facial expressions and hand actions to the processor 30.

S103: analyzing the at least two kinds of information and estimating whether a mirror is requested, and if yes, proceeding to block S104; if not, the process ends;

Specifically, the estimating module 270 can compare an orientation of the mobile terminal 100 held by the user sensed by the gravity sensor 50 with the orientation of the mobile terminal 100 habitually held stored in the storage device 40. The estimating module 270 compares a value of a distance between a face and the screen 20 sensed by the distance sensor 60 with the preset distance threshold stored in the storage device 40. The estimating module 270 compares a plurality of hand actions collected by the front camera 70 with the repeated actions stored in the storage device 40. The estimating module 270 estimates whether or not the facial expression changes according to the plurality of facial expressions collected by the front camera 70. Wherein, it is satisfied at least two kinds of information selected from following information: the orientation of the mobile terminal 100 held by the user sensed by the gravity sensor 50 is the same as the orientation of the mobile terminal 100 habitually held stored in the storage device 40, the value of a distance between the face and the screen 20 sensed by the distance sensor 60 is greater than the value of the preset distance threshold stored in the storage device 40, the plurality of hand actions collected by the front camera 70 is the same as the repeated actions stored in the storage device 40, and the facial expression is estimated to have changed according to the plurality of facial expressions collected by the front camera 70, so that the user can be supposed to have the need to look in the mirror. Otherwise, the user does not have the need to look in the mirror.

S104: controlling the screen 20 to the mirror when the mirror is requested according to the analysis.

Specifically, the screen control module 280 controls the screen 20 to be switched off or in a dark state for the user to use a mirror according to the analysis.

S105: controlling the rear camera 80 to collect a plurality of images of scene of a side of the mobile terminal 100 opposite to the screen 20.

Specifically, the rear camera control module 250 controls the rear camera 80 to collect a plurality of images of scene of a side of the mobile terminal 100 opposite to the screen 20.

S106: controlling the screen 20 to open a small window to display the images of scene collected by the rear camera 80 in real time.

Specifically, the screen control module 280 controls the screen 20 to open a small window (not shown in FIG. 3) to display the images of scene collected by the rear camera 80 in real time.

It can be understood that the S105 and the S106 can be removed without affecting the screen 20 in the opening state for the user to use as a mirror.

It can be understood that the mirror activating method of the mobile terminal can further include the following blocks: adjusting the preset distance threshold stored in the storage device 40 according to a plurality of values of a distance between a face and the screen 20 sensed by the distance sensor 60 each time the mirror of the mobile terminal 100 is used.

Specifically, the studying and confirming module 260 adjusts the preset distance threshold stored in the storage device 40 according to a plurality of values of the distance between a face and the screen 20 sensed by the distance sensor 60 each time the mirror of the mobile terminal 100 is used.

It can be understood that the mirror activating method of the mobile terminal can further include following blocks: studying and confirming some facial expression changes of the user indicated that the user has a mirror requirement according to the plurality of facial expressions collected by the front camera 70 each time the mirror of the mobile terminal 100 is used.

Specifically, the studying and confirming module 260 studies and confirms some facial expression changes of the user indicated that the user has a mirror requirement according to the plurality of facial expressions collected by the front camera 70 each time the mirror of the mobile terminal 100 is used.

It can be understood that the mirror activating method of the mobile terminal can further include following blocks: confirming an orientation of the mobile terminal 100 habitually held by the user according to the orientation of the mobile terminal 100 held by the user each time when looking in a mirror.

Specifically, the studying and confirming module 260 confirms an orientation of the mobile terminal 100 habitually held by the user according to the orientation of the mobile terminal 100 held by the user each time when looking in a mirror.

It can be understood that the mirror activating method of the mobile terminal can further include following blocks: confirming a plurality of repeated actions of the hands when the mirror of the mobile terminal 100 is used each time.

Specifically, the studying and confirming module 260 confirms a plurality of repeated actions of the hands when the mirror of the mobile terminal 100 is used each time.

The mobile terminal 100, the mirror activating system 200, and the mirror activating method of the mobile terminal, can utilize the screen 20 having a one-way see-through glass, obtain and analyze the at least two kinds of information selected from information consisting of an orientation of the mobile terminal 100, a distance between the face and the screen 20, a plurality of facial expressions and a plurality of hand actions for estimating whether a mirror is requested, and control the screen to be closed or to be in a dark state for the user to use as a mirror. The mobile terminal 100, the mirror activating system 200, and the mirror activating method of the mobile terminal have high efficiency and high intelligence.

The embodiments shown and described above are only examples. Many details are often found in the art such as the other features of a mobile terminal. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A mobile terminal, comprising:
   a housing;
   a screen comprising a one-way see-through glass on the housing, wherein the screen is adapted to a mirror when the screen is switched off or in a dark state;
   a gravity sensor in the housing;
   a distance sensor in the housing;
   a front camera in the housing;
   a processor; and
   a storage device storing a preset distance threshold between a human face and the screen, an orientation of the mobile terminal when the screen is functioning as the mirror, repeated actions of the hand when using the mobile terminal as a mirror, and a plurality of instructions loadable and executable by the processor, wherein the processor is adapted for executing the instructions to:
      obtain at least two kinds of information selected from information consisting of an orientation of the mobile terminal sensed by the gravity sensor, a distance between a face and the screen sensed by the distance sensor, a facial expression and a hand action collected by the front camera;
      analyze the information and estimate whether a request for mirror function is being made, wherein determining that a mirror is being requested when at least two pieces of information selected from the orientation of the mobile terminal sensed by the gravity sensor being same as the orientation of the mobile terminal stored in the storage device when the screen has mirror function, or the value of a distance between the human face and the screen sensed by the distance sensor being greater than a value of a preset distance threshold stored in the storage device, or the hand actions collected by the front camera are same as the repeated actions stored in the storage device, or the facial expression having changed to one or more of the facial expressions collected by the front camera; and
      control the screen to function as mirror when the mirror is being requested according to the analysis.

2. The mobile terminal of claim 1, wherein the processor is further adapted for executing instructions to:
   detect whether the screen is turned on before obtaining the at least two kinds of information selected from information consisting of the orientation of the mobile terminal sensed by the gravity sensor, the distance between the face and the screen sensed by the distance sensor, the facial expression and the hand action collected by the front camera.

3. The mobile terminal of claim 1, wherein the mobile terminal further comprises a rear camera; and the processor is further adapted for executing instructions to:
   control the rear camera to collect a plurality of images of scene of a side of the mobile terminal opposite to the screen; and
   control the screen to open a window to display the images of scene collected by the rear camera in real time.

4. A mirror activating method of a mobile terminal, comprising:
   obtain at least two kinds of information selected from information consisting of an orientation of the mobile terminal sensed by a gravity sensor, a distance between a face and a screen sensed by a distance sensor, a facial expression and a hand action collected by a front camera;
   analyze the information and estimate whether a mirror is being requested, wherein request for a mirror is deemed confirmed when at least two information selected from the orientation of the mobile terminal sensed by the gravity sensor is same as an orientation of the mobile terminal stored in a storage device when the screen is functioning as the mirror, or the value of a distance between the face and the screen sensed by the distance sensor is greater than a value of a preset distance threshold stored in the storage device, or the hand actions collected by the front camera are same as a plurality of repeated actions stored in the storage device, or the facial expression has changed to the facial expressions collected by the front camera; and
   control the screen to function as the mirror when the mirror is being requested according to the analysis.

5. The mirror activating method of the mobile terminal of claim 4, further comprising: detect whether the screen is turned on before obtaining the at least two kinds of information selected from information consisting of the orientation of the mobile terminal sensed by the gravity sensor, the distance between the face and the screen sensed by the distance sensor, the facial expression and the hand action collected by the front camera.

6. The mirror activating method of the mobile terminal of claim 4, wherein the mirror activating method of the mobile terminal further comprises following steps:
   control a rear camera to collect a plurality of images of scene of a side of the mobile terminal opposite to the screen; and
   control the screen to open a window to display the images of scene collected by the rear camera in real time.

7. A storage device adapted to store a plurality of instructions, wherein each instruction is adapted to be loaded and executed by a processor, and comprises:
   obtain at least two kinds of information selected from information consisting of an orientation of the mobile terminal sensed by a gravity sensor, a distance between a face and a screen sensed by a distance sensor, a facial expression and a hand action collected by a front camera;
   analyze the information and estimate whether a request for mirror is being made, wherein request for a mirror is deemed confirmed when at least two information selected from the orientation of the mobile terminal sensed by the gravity sensor is same as the orientation of the mobile terminal stored in a storage device when the screen is the mirror, or the value of a distance between the face and the screen sensed by the distance sensor is greater than a value of a preset distance threshold stored in the storage device, or the hand actions collected by the front camera are same as the repeated actions stored in the storage device, or the facial expression has changed to the facial expressions collected by the front camera; and
   control the screen to function as the mirror when the mirror is requested according to the analysis.

8. The storage device of claim 7, wherein each instruction is adapted to be loaded and executed by the processor, and comprises:
    detect whether the screen is turned on before obtaining the at least two kinds of information selected from information consisting of the orientation of the mobile terminal sensed by the gravity sensor, the distance between the face and the screen sensed by the distance sensor, the facial expression and the hand action collected by the front camera.

9. The storage device of claim 7, wherein each instruction is adapted to be loaded and executed by the processor, and comprises:
    control a rear camera to collect a plurality of images of scene of a side of the mobile terminal opposite to the screen; and
    control the screen to open a window to display the images of scene collected by the rear camera in real time.

* * * * *